(12) United States Patent
Tang

(10) Patent No.: US 8,082,676 B2
(45) Date of Patent: Dec. 27, 2011

(54) BRAKE MECHANISM FOR WHEELED DISTANCE MEASURING DEVICE

(76) Inventor: Yi-Wen Tang, Taichung (TW)

( * ) Notice: Subject to any disclaimer, the term of this patent is extended or adjusted under 35 U.S.C. 154(b) by 814 days.

(21) Appl. No.: 12/185,136

(22) Filed: Aug. 4, 2008

(65) Prior Publication Data

US 2010/0024236 A1    Feb. 4, 2010

(51) Int. Cl.
*G01B 3/12* (2006.01)
(52) U.S. Cl. .............. 33/772; 33/782; 33/779
(58) Field of Classification Search .............. 33/772, 33/767, 779, 782
See application file for complete search history.

(56) References Cited

U.S. PATENT DOCUMENTS

| | | | | |
|---|---|---|---|---|
| 727,420 A * | 5/1903 | Nunamaker | | 33/782 |
| 919,016 A * | 4/1909 | Irino | | 33/782 |
| 2,595,021 A * | 4/1952 | Swanson | | 33/781 |
| 2,716,819 A * | 9/1955 | Staples | | 33/781 |
| 2,741,031 A * | 4/1956 | Martin, Jr. et al. | | 33/781 |
| 3,151,397 A * | 10/1964 | King et al. | | 33/782 |
| 3,251,132 A * | 5/1966 | Hall | | 33/781 |
| 4,176,458 A * | 12/1979 | Dunn | | 33/781 |
| 7,040,036 B1 * | 5/2006 | Wang | | 33/782 |
| 7,536,805 B1 * | 5/2009 | Tang | | 33/782 |
| 7,555,846 B1 * | 7/2009 | Wang | | 33/772 |
| 7,694,431 B2 * | 4/2010 | Tang | | 33/772 |
| 2007/0084076 A1 * | 4/2007 | Wang | | 33/772 |

* cited by examiner

*Primary Examiner* — Christopher Fulton

(57) ABSTRACT

A brake mechanism for a wheeled distance measuring device includes a first brake rod and a second brake rod, both of which are located in a pole unit of the distance measuring device. The first brake rod is connected with a brake key and the second brake rod is connected with a contact section which has a brake pad connected thereto. The brake key includes first and second protrusions and a control rod is connected with the first brake rod, the control rod includes third and fourth protrusions. A locking recess is defined between the third and fourth protrusions. The first and second brake rods are lowered to brake the wheel by the brake pad when the first protrusion presses the third protrusion. The second protrusion is locked in the locking recess and presses the third protrusion to keep the wheel to be braked.

19 Claims, 7 Drawing Sheets

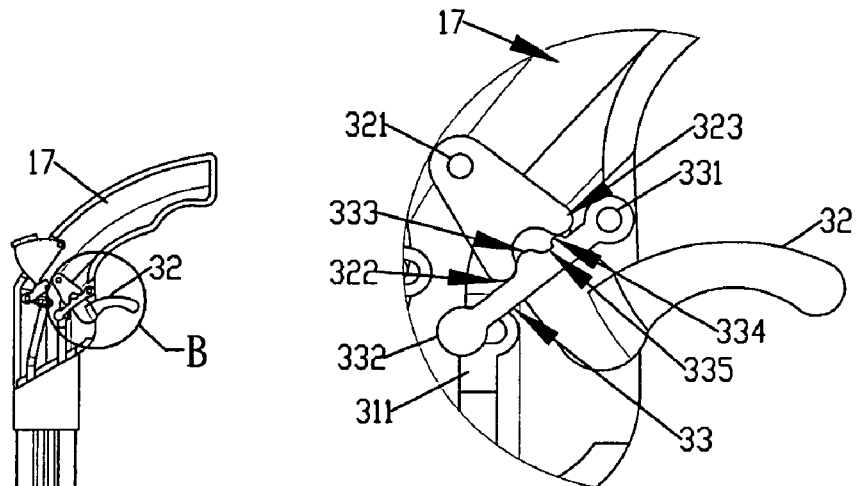
FIG. 7
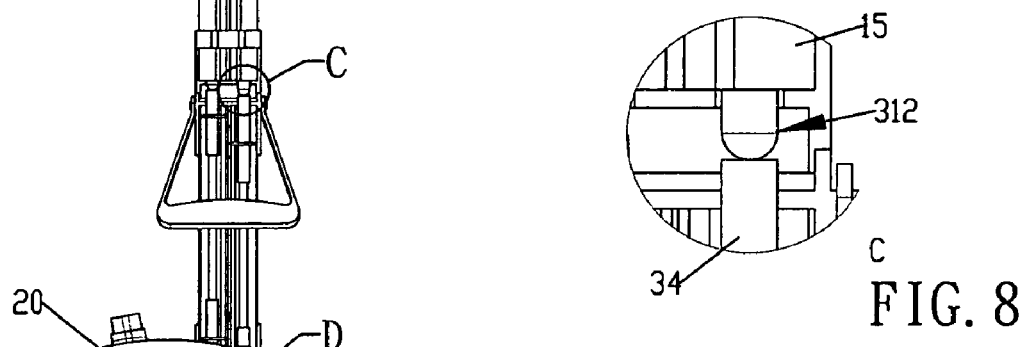
FIG. 8
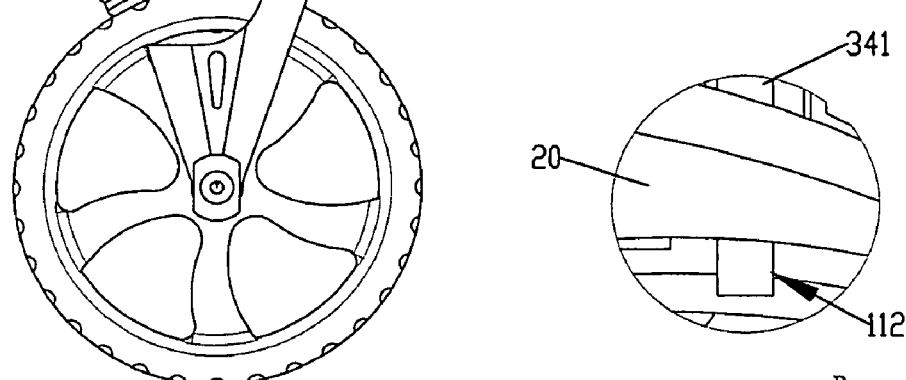
FIG. 9
FIG. 6

BRAKE MECHANISM FOR WHEELED DISTANCE MEASURING DEVICE

FIELD OF THE INVENTION

The present invention relates to a wheeled distance measuring device, and more particularly, to a brake mechanism for the distance measuring device and the brake mechanism is able to keep the distance measuring device in the brake status while moving the distance measuring device.

BACKGROUND OF THE INVENTION

A conventional distance measuring device is disclosed in U.S. Pat. No. 7,040,036 to Hui Chen Wang who is the wife of applicant and includes a wheel rotatably connected to a pole and a measuring unit is connected to a side of the wheel. The wheel includes a radius and rolls against a surface and the number of revolutions of the wheel can be counted by a counter in the measuring unit so as to obtain the distance that the wheel travels. A handle is connected to the other end of the pole and includes a brake key and an initialization key, two respective cables are connected to the brake key and the initialization key so as to brake the wheel and initialize the counter.

When using the measuring device, the counter is first initialized and the brake key is released, the user rolls the wheel on the surface and stops the wheel by operation of the brake key when the end of the distance to be measured is reached. The result of the number of revolution or the distance that the measuring device travels can be read. However, the user has to hold the brake key when reading the result and once the brake key is unintentionally released, the wheel might roll a small distance and the result will not be correct. In some situations, the user has to move the measuring device to a place where sufficient light is provided so as to read the result, the user then has to keep the brake key at the brake position for a while and this is not an easy task. The brake key can be released if an impact is applied to the device or the user slips or any unexpected situation happens.

The present invention intends to provide a brake mechanism for a wheeled distance measuring device wherein the brake mechanism can be locked to the brake position without pressing the brake key all the time when moving the measuring device.

SUMMARY OF THE INVENTION

The present invention relates to a wheeled distance measuring device and the device comprises a wheel connected with a front fork which includes an insertion hole defined through a top thereof and communicates with an opening defined in an underside of the front fork. The opening faces the wheel. A pole unit includes first, second, third and fourth tubes, and a handle is connected with the fourth tube. The first tube is securely inserted into the insertion hole. The handle has a control slot defined in a side thereof and a top slot which communicates with the control slot.

A brake unit has a first brake rod, a brake key, a control rod and a second brake rod. The first brake rod is received in the fourth tube and a link is connected to a top of the first brake rod. The link is located in the handle. A contact section is connected to a lower end of the first brake rod and has a brake pad. The brake key extends through the control slot of the handle and is pivotably connected to the handle. The brake key includes first and second protrusions on a side thereof and a gap is defined between the first and second protrusions. The control rod is pivotably engaged with the handle. A third protrusion and a fourth protrusion protrude from the control rod and a locking recess is defined between the third and fourth protrusions. The third protrusion and the fourth protrusion are located between the first and second protrusions when the wheel is not braked.

The second brake rod is received in the first tube and a top end of the second brake rod is located in the second tube and in contact with a lower end of the first brake rod. The brake pad is pushed to brake the wheel when the first brake rod is moved to push the second brake rod downward. The control rod is pivoted downward to push the brake rod downward when the first protrusion presses the third protrusion downward by operating the brake key. When the second protrusion is shifted and positioned in the locking recess, the second protrusion is positioned in the locking recess to press the third protrusion downward so that the first brake rod and the second brake rod are kept to brake the wheel.

The primary object of the present invention is to provide a brake mechanism for a wheeled distance measuring device and the brake mechanism is optionally to brake the wheel of the distance measuring device temporarily or for a period of time by locking the brake key at a locked position.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 6 is a side view, partially removed of the brake mechanism of the present invention cooperated with the wheeled distance measuring device;

FIG. 7 is an enlarged view to show the portion circled by circle "B" in FIG. 6;

FIG. 8 is an enlarged view to show the portion circled by circle "C" in FIG. 6;

FIG. 9 is an enlarged view to show the portion circled by circle "D" in FIG. 6;

DETAILED DESCRIPTION OF THE PREFERRED EMBODIMENT

Figure 1:
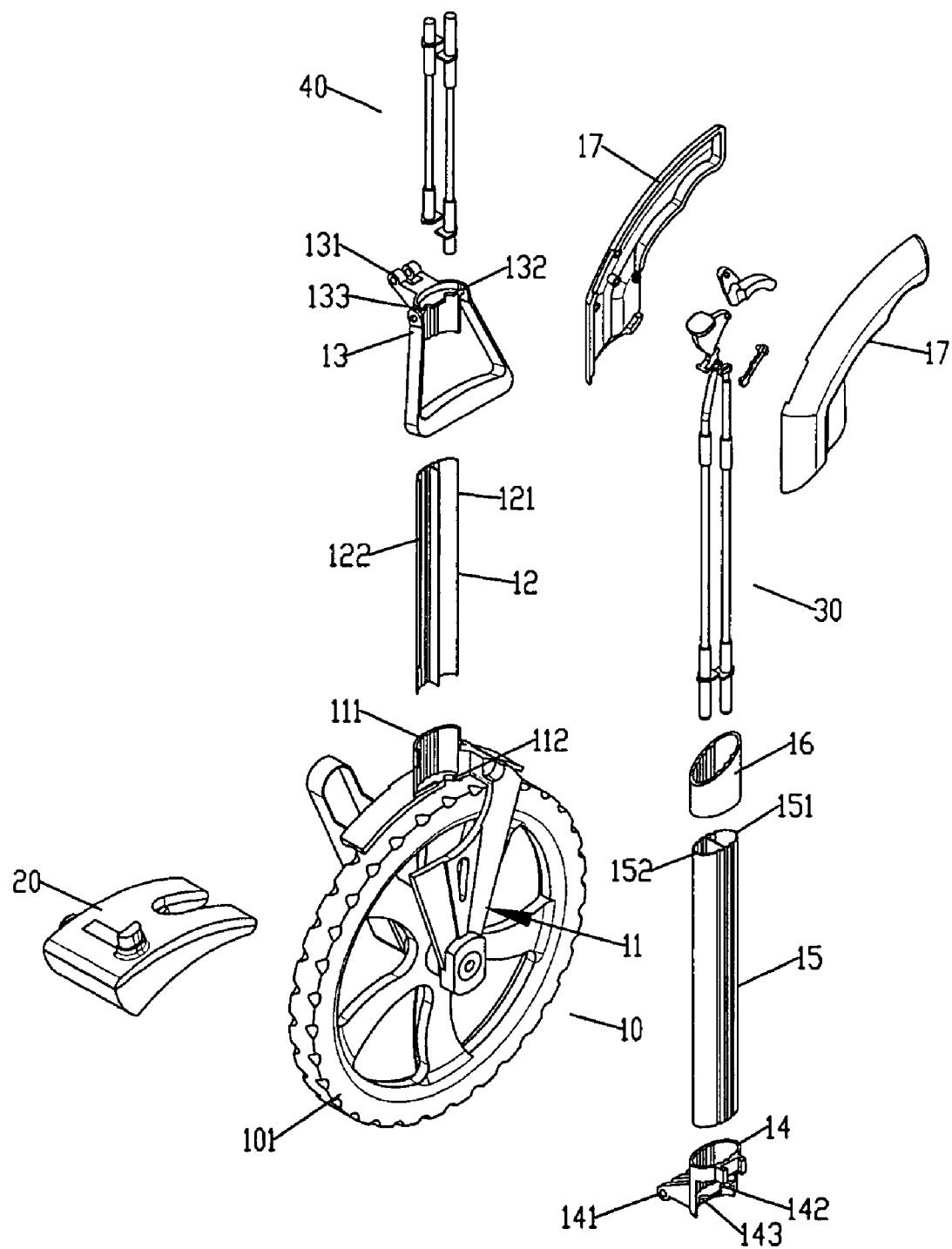
FIG. 1 is an exploded view to show the brake mechanism of the present invention and parts of the wheeled distance measuring device.
Figure 2:
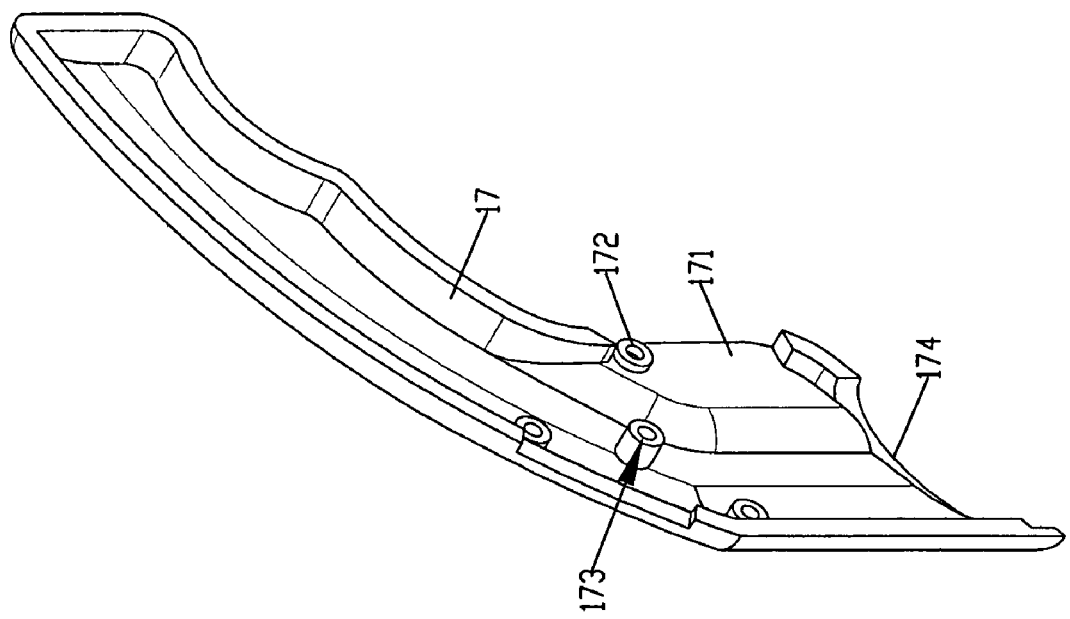
FIG. 2 shows one of two parts of the handle of the brake mechanism of the present invention.
Figures 3, 4:
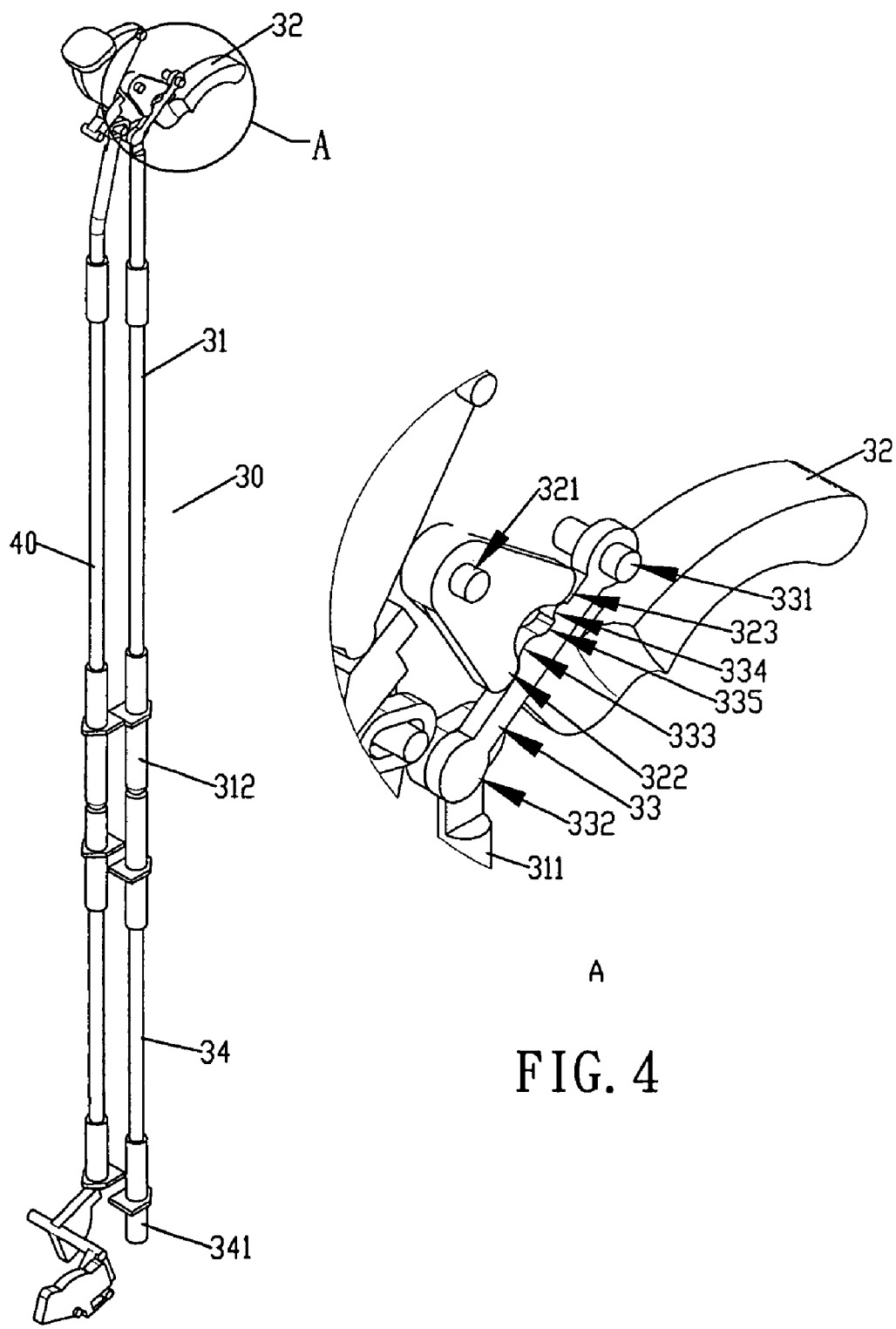
FIG. 3 is a perspective view to show the brake mechanism of the present invention.
FIG. 4 is an enlarged view to show the portion circled by circle "A" in FIG. 3.
Figure 5:
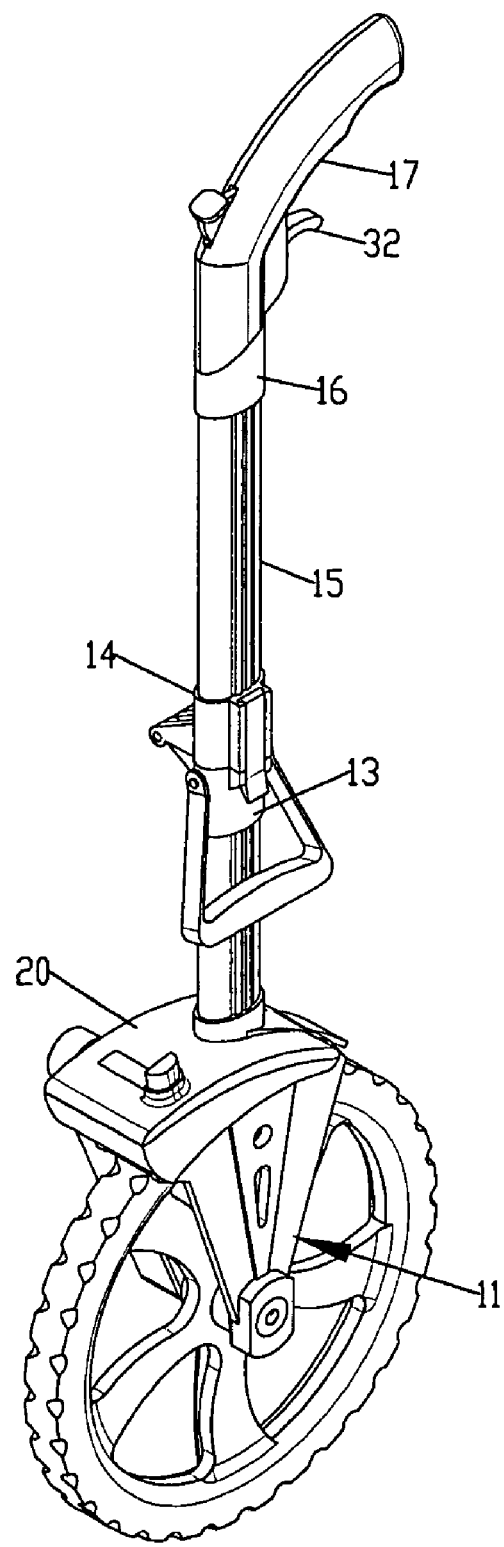
FIG. 5 is a perspective view to show the brake mechanism of the present invention cooperated with the wheeled distance measuring device.

Referring to FIGS. 1 and 5, the wheeled distance measuring device comprises a wheel unit 10 having a wheel 101 and a front fork 11 with which the wheel 101 is rotatably connected. A pole unit is connected to the front fork 11 and a handle 17 is connected to a top of the pole unit. A measuring unit 20 is connected to a top of the front fork 11 and includes a counter for counting number of revolutions of the wheel 101 and an initialization unit which is able to set the counter to be zero. A brake unit 30 is connected to the wheeled distance measuring device so as to brake the wheel 101.

The front fork includes an insertion hole 111 defined through a top thereof and the insertion hole 111 communicates with an opening 112 defined in an underside of the front fork 11. The opening 112 faces the wheel 101.

The pole unit is composed of a first tube 12, a second tube 13, a third tube 14, a fourth tube 15 and a fifth tube 16. The first tube 12 has a first end thereof securely inserted into the insertion hole 111. The second tube 13 has a first end connected to a second end of the first tube 12 and a first pivot 131 is located on a side of the second tube 13. A third tube 14 has a first end connected to a second end of the second tube 13 and has a second pivot 141 on a side thereof. The first and second pivots 131, 141 are pivotably connected to each other and a lever handle is connected to the second tube 13 so that the third tube 14 is able to pivoted relative to the third tube 13. The fourth tube 15 has a first end connected to a second end of the third tube 14. The fifth tube 16 is connected between a second end of the fourth tube 15 and the handle 17. The handle 17 is composed of two parts and includes a control slot 171 defined in a side thereof and a top slot 174 defined in a top thereof. The control slot 171 and the top slot 174 are in communication with each other. The second end of the fourth tube 15 is engaged with the top slot 174. A first recess 172 and a second recess 173 are defined in the handle 17, wherein the first recess 172 is located above the control slot 171 in the handle 17 and the second recess 173 is located on a common horizontal plane with the first recess 172.

The first tube 12 includes a first passage 121 and a second passage 122 defined axially therein, a separation plates separates the first passage 121 and the second passage 122. The second tube 13 includes a first hole 132 and a second hole 133, the first hole 132 communicates with the first passage 121 and the second hole 133 communicates with the second passage 122. The third tube 14 includes a third hole 142 and a fourth hole 143, the third hole 142 communicates with the first hole 132 and the fourth hole 143 communicates with the second hole 133. The fourth tube 15 includes a third passage 151 and a fourth passage 152 defined axially therethrough. The third passage 151 communicates with the third hole 142 and the fourth passage 152 communicates with the fourth hole 143. The first and third passages 121, 151 communicate with each other and the second and fourth passages 122, 152 communicate with each other. It is noted that there are many different combination options for the pole unit, such as the front fork 11 and the first tube 12 are a one-piece member, the first and second tubes 12, 13 are a one-piece member, the third and fourth tubes 14, 15 are a one-piece member, or the fourth and fifth tubes 15, 16 are a one-piece member.

As shown in FIGS. 2 to 10, the brake unit 30 includes a first brake rod 31, a brake key 32, a control rod 33 and a second brake rod 34. The first brake rod 31 is located in the third passage 151 of the fourth tube 15 and a link 311 is connected to a top of the first brake rod 31. The link 311 is located in the handle 17. A contact section 312 is connected to a lower end of the first brake rod 31 and located in the third hole 142 of the third tube 14 as shown in FIG. 8. The brake key 32 extends through the control slot 171 of the handle 17 and has a third pivot 321 which is pivotably engaged with the second recess 173 of the handle 17. The third pivot 321 includes first and second protrusions 322, 323 on a side thereof and a gap is defined between the first and second protrusions 322, 323. The control rod 33 has a fourth pivot 331 on a first end thereof and the fourth pivot 331 is pivotably engaged with the first recess 172 in the handle 17. A fifth pivot 332 is located on a second end of the control rod 33 and pivotably connected to the link 311 of the first brake rod 31. A third protrusion 333 and a fourth protrusion 334 are located between the fourth and fifth pivots 331, 332. A locking recess 335 is defined between the third and fourth protrusions 333, 334. The third protrusion 333 and the fourth protrusion 334 are located between the first and second protrusions 322, 323 when the wheel 101 is not braked as shown in FIG. 7.

The second brake rod 34 is received in the first passage 121 of the first tube 12 and a top end of the second brake rod 34 is located in the first hole 132 of the second tube 13. The top end of the second brake rod 34 is in contact with the contact section 312 at the lower end of the first brake rod 31 as shown in FIG. 8. A brake pad 341 as shown in FIG. 9 is connected to a lower end of the second brake rod 34 and extends through the opening 112 of the front fork 11. The brake pad 341 is pushed to brake the wheel 101 when the first brake rod 31 is moved to push the second brake rod 34 downward. Besides, an initialization unit 40 is located within the pole unit and is operated via the handle 17.

Figure 10:
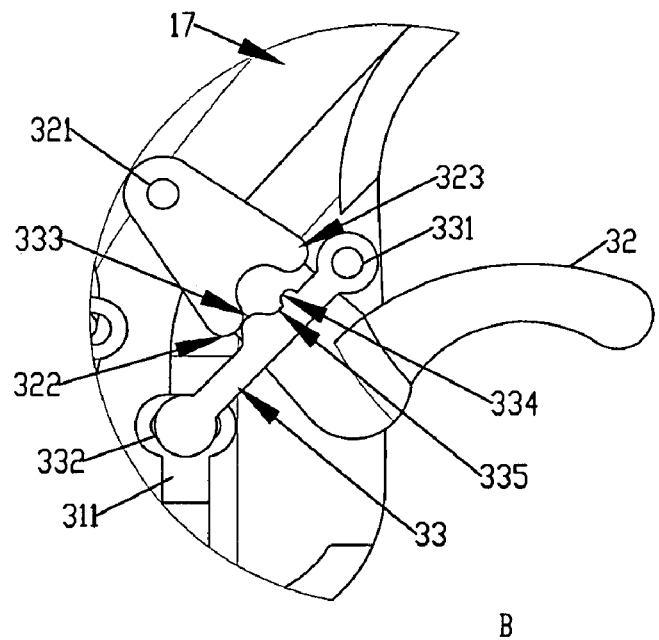
FIG. 10 is an enlarged view to show the portion circled by circle "B" in FIG. 6 when the brake key is pulled.
Figure 11:
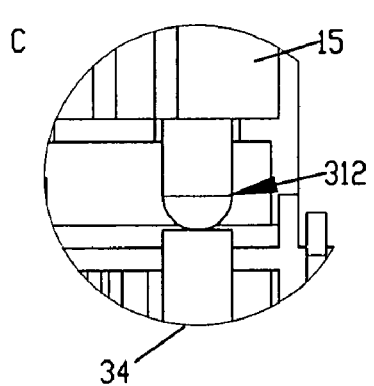
FIG. 11 is an enlarged view to show the portion circled by circle "C" in FIG. 6 when the brake key is pulled.
Figure 12:
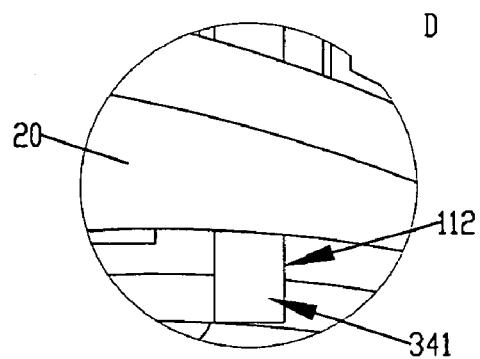
FIG. 12 is an enlarged view to show the portion circled by circle "D" in FIG. 6 when the brake key is pulled.

As shown in FIGS. 10 to 12, when pulling the brake key 32, the first protrusion 322 presses the third protrusion 333 downward so that the control rod 33 is pivoted downward to push the brake rod 31 downward. The second brake rod 34 is then pushed by the lowered contact section 312 at the lower end of the first brake rod 31, the brake pad 341 on the second brake rod 34 is lowered to brake the wheel 101.

Figure 13:
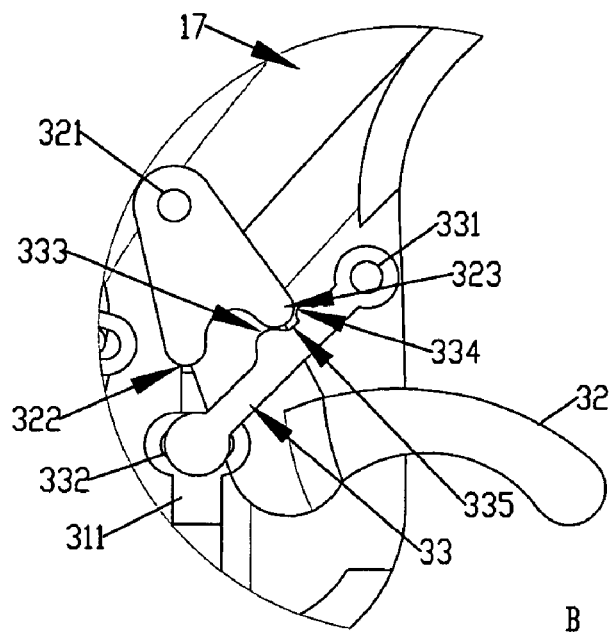
FIG. 13 is an enlarged view to show the portion circled by circle "B" in FIG. 6 when the brake key is locked.
Figure 14:
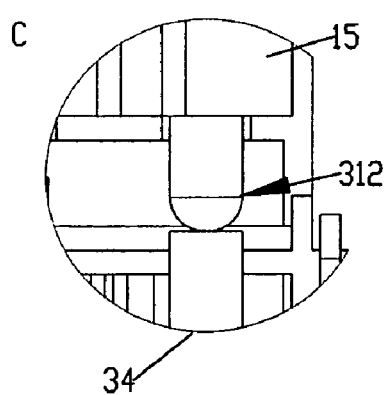
FIG. 14 is an enlarged view to show the portion circled by circle "C" in FIG. 6 when the brake key is locked.
Figure 15:
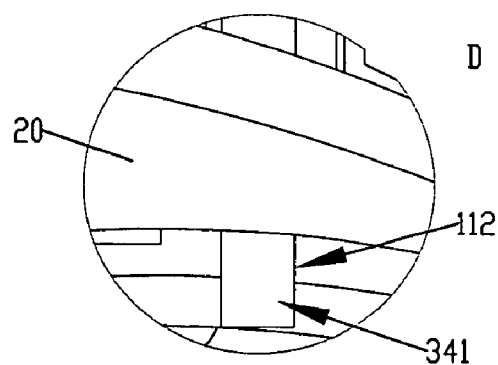
FIG. 15 is an enlarged view to show the portion circled by circle "D" in FIG. 6 when the brake key is locked.

As shown in FIGS. 13 to 15, when the user wants to keep the wheeled distance measuring device in braked status, he or she can operate the brake key 32 to shift the second protrusion 323 to be positioned in the locking recess 335, the second protrusion 323 is locked at a position in the locking recess 335 and presses the third protrusion 333 downward so that the first brake rod 31 and the second brake rod 34 are kept to brake the wheel 101 even if the brake key 32 is released.

The brake mechanism of the present invention can brake the wheel 101 temporarily or permanently by operation of the brake key 32 so that if the user wants to move the wheeled distance measuring device from a dark place to another place where has sufficient light to read the result, he or she can lock the brake key 32 so that the wheel 101 will not rotate.

While we have shown and described the embodiment in accordance with the present invention, it should be clear to those skilled in the art that further embodiments may be made without departing from the scope of the present invention.

What is claimed is:
1. A wheeled distance measuring device comprising:
a wheel unit (10) having a wheel (101) and a front fork (11) with which the wheel (101) is rotatably connected, an insertion hole (111) defined through a top of the front fork (11) and communicating with an opening (112) defined in an underside of the front fork (11), the opening (112) facing the wheel (101);
a first tube (12) having a first end thereof securely inserted into the insertion hole (111), a second tube (13) having a first end connected to a second end of the first tube (12) and a first pivot (131) located on a side of the second tube (13), a third tube (14) having a first end connected to a second end of the second tube (13) and having a second pivot (141) on a side thereof, the first and second pivots

(131, 141) being pivotably connected to each other, a fourth tube (15) having a first end connected to a second end of the third tube (14);

a handle (17) connected to a second end of the fourth tube (15) and having a control slot (171) defined in a side thereof, a top slot (174) defined in a top thereof and communicating with the control slot (171), a second end of the fourth tube (15) engaged with the top slot (174), a first recess (172) and a second recess (173) defined in the handle (17);

a brake unit (30) having a first brake rod (31), a brake key (32), a control rod (33) and a second brake rod (34), the first brake rod (31) received in the fourth tube (15) and a link (311) connected to a top of the first brake rod (31), the link (311) located in the handle (17), a contact section (312) connected to a lower end of the first brake rod (31), the brake key (32) extending through the control slot (171) of the handle (17) and having a third pivot (321) which is pivotably engaged with the second recess (173) of the handle (17), the third pivot (321) including first and second protrusions (322, 323) on a side thereof and a gap defined between the first and second protrusions (322, 323), the control rod (33) having a fourth pivot (331) on a first end thereof and the fourth pivot (331) pivotably engaged with the first recess (172) in the handle (17), a fifth pivot (332) located on a second end of the control rod (33) and pivotably connected to the link (311) of the first brake rod (31), a third protrusion (333) and a fourth protrusion (334) located between the fourth and fifth pivots (331, 332), a locking recess (335) defined between the third and fourth protrusions (333, 334), the third protrusion (333) and the fourth protrusion (334) being located between the first and second protrusions (322, 323) when the wheel (101) is not braked;

the second brake rod (34) received in the first tube (12) and a top end of the second brake rod (34) located in the second tube (13) and in contact with a lower end of the first brake rod (31), a brake pad (341) connected to a lower end of the second brake rod (34) and extending through the opening (112) of the front fork (11), the brake pad (341) being pushed to brake the wheel (101) when the first brake rod (31) is moved to push the second brake rod (34) downward, and the control rod (33) being pivoted downward to push the brake rod (31) downward when the first protrusion (322) presses the third protrusion (333) downward by operating the brake key (32), when the second protrusion (323) is shifted and positioned in the locking recess (335), the second protrusion (323) is locked at a position in the locking recess (335) to press the third protrusion (333) downward so that the first brake rod (31) and the second brake rod (34) are kept to brake the wheel (101).

2. The device as claimed in claim 1, wherein the first tube (12) includes a first passage (121) and a second passage (122) defined axially therein, a separation plates separates the first passage (121) and the second passage (122).

3. The device as claimed in claim 2, wherein the second tube 13 includes a first hole (132) and a second hole (133), the first hole (132) communicates with the first passage (121) and the second hole (133) communicates with the second passage (122).

4. The device as claimed in claim 3, wherein the third tube (14) includes a third hole (142) and a fourth hole (143), the third hole (142) communicates with the first hole (132) and the fourth hole (143) communicates with the second hole (133).

5. The device as claimed in claim 4, wherein the fourth tube (15) includes a third passage (151) and a fourth passage (152) defined axially therethrough, the third passage (151) communicates with the third hole (142) and the fourth passage (152) communicates with the fourth hole (143), the first and third passages (121, 151) communicate with each other and the second and fourth passages (122, 152) communicate with each other.

6. The device as claimed in claim 5, wherein the first brake rod (31) is located in the third passage (151) of the fourth tube (15).

7. The device as claimed in claim 4, wherein the contact section (312) of the first brake rod (31) is located in the third hole (142) of the third tube (14).

8. The device as claimed in claim 3, wherein the second brake rod (34) is located in the first passage (121) of the first tube (12), the top end of the second brake rod (34) is located in the first hole (132) of the second tube (13).

9. The device as claimed in claim 1, wherein a lever handle is pivotably connected to the second tube (13).

10. The device as claimed in claim 1, wherein a fifth tube (16) is connected between the fourth tube (15) and the handle (17).

11. The device as claimed in claim 10, wherein the fourth and fifth tubes (15, 16) are a one-piece member.

12. The device as claimed in claim 1, wherein the handle (17) is composed of two parts.

13. The device as claimed in claim 1, wherein the first recess (172) is located above the control slot (171) in the handle (17).

14. The device as claimed in claim 1, wherein the second recess (173) is located on a common horizontal plane with the first recess (172).

15. The device as claimed in claim 1, wherein a measuring unit (20) is connected to the front fork (11).

16. The device as claimed in claim 1, wherein an initialization unit (40) is located with in the first, second, third and fourth tubes (12, 13, 14 and 15), and is operated via the handle (17).

17. The device as claimed in claim 1, wherein the front fork (11) and the first tube (12) are a one-piece member.

18. The device as claimed in claim 1, wherein the first and second tubes (12, 13) are a one-piece member.

19. The device as claimed in claim 1, wherein the third and fourth tubes (14, 15) are a one-piece member.

* * * * *